Figure 9:
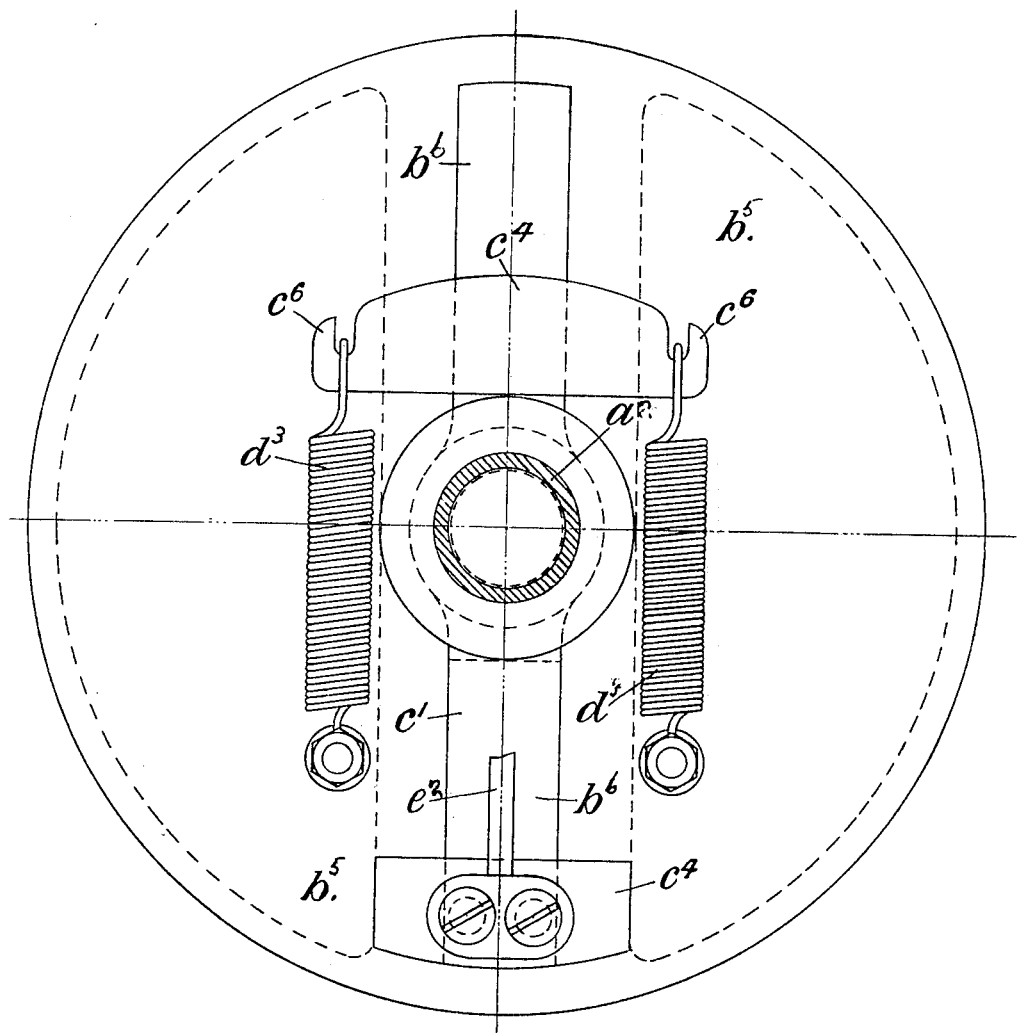

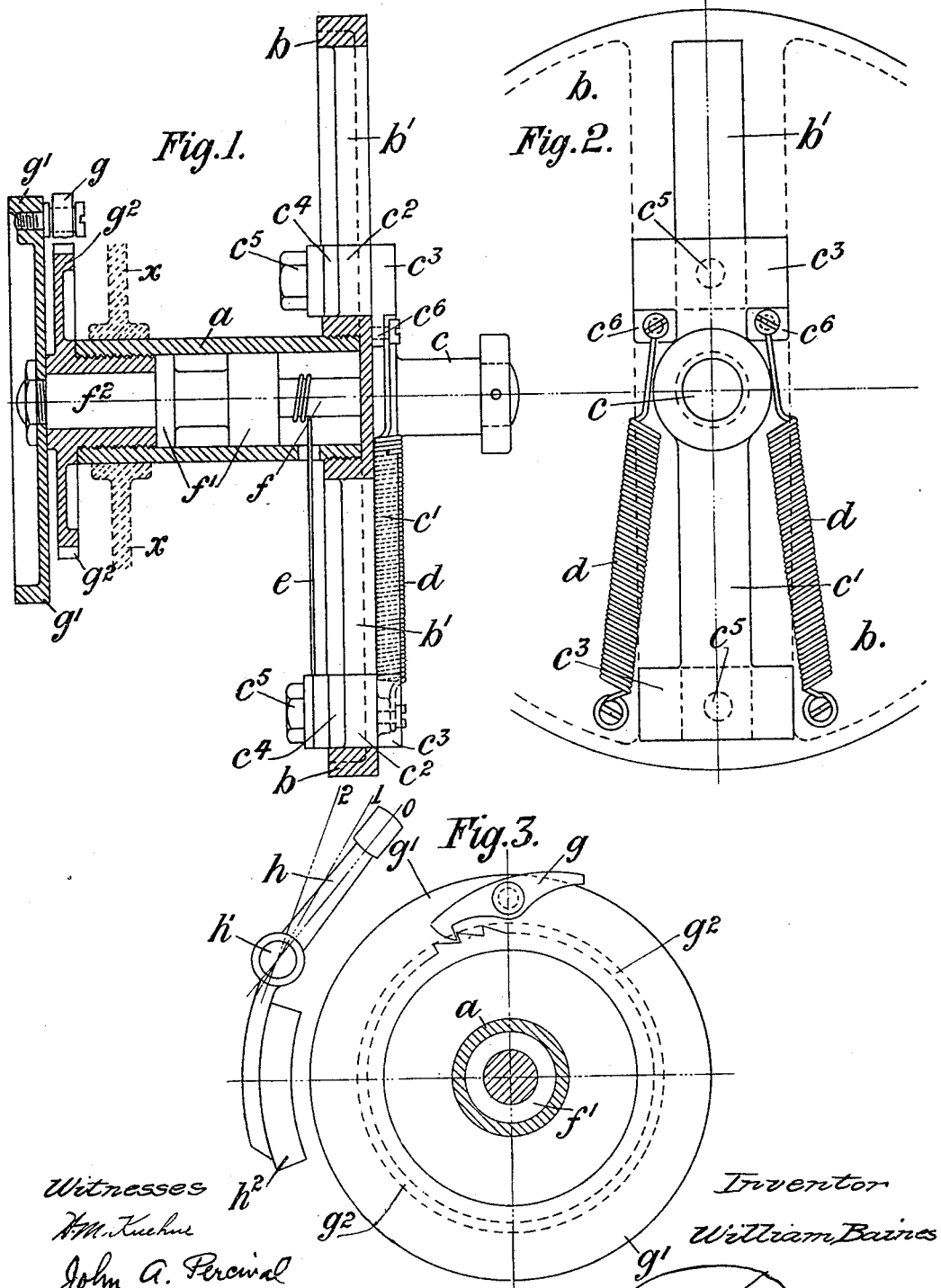

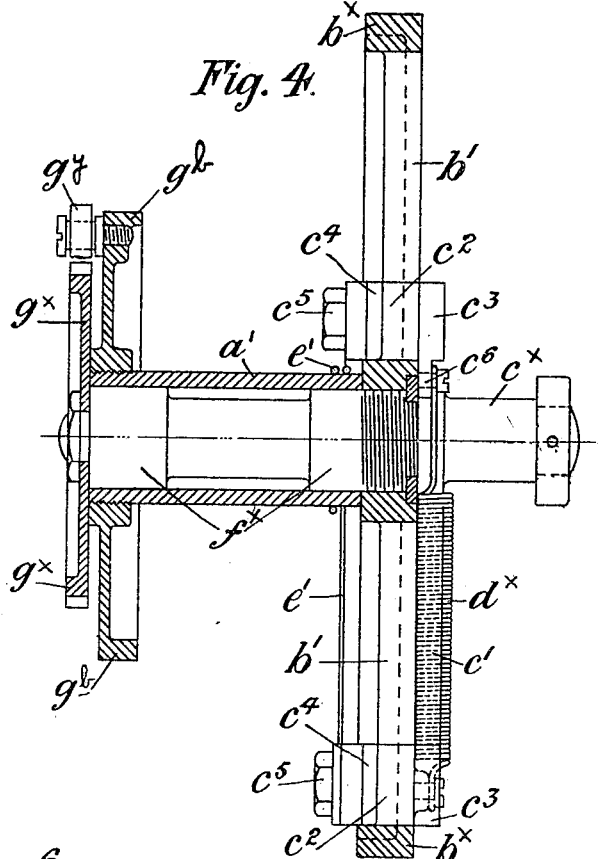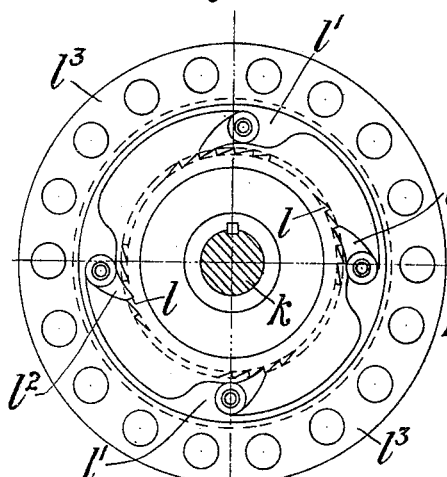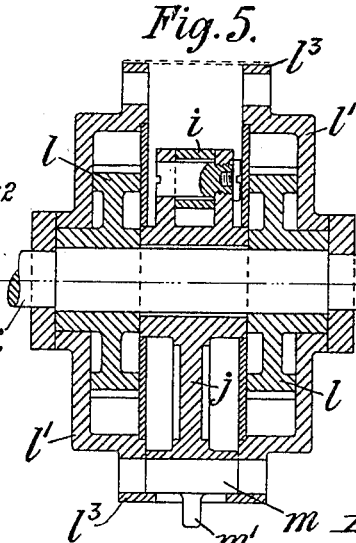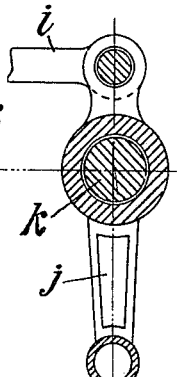

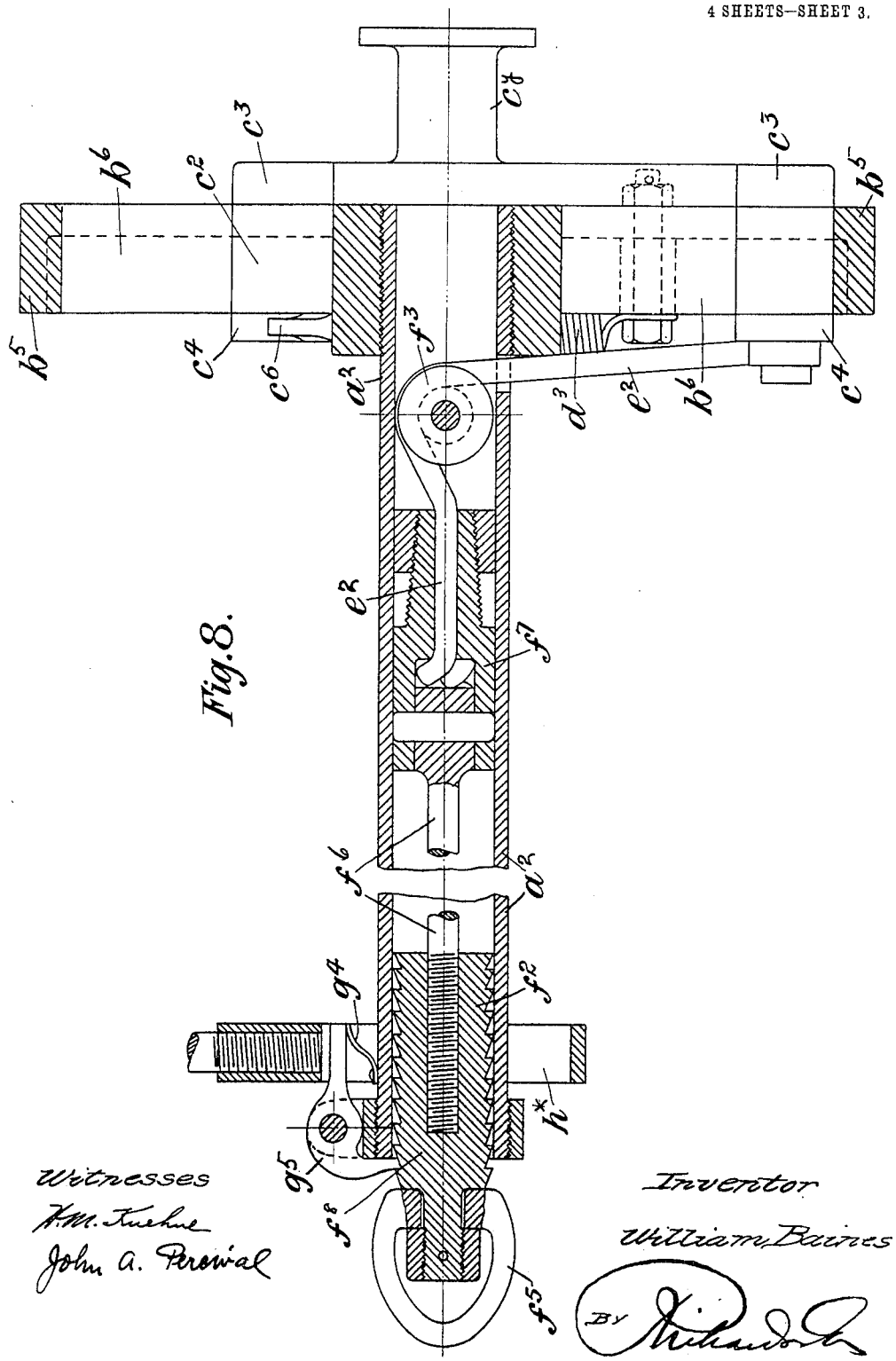

No. 819,118. PATENTED MAY 1, 1906.
W. BAINES.
VARIABLE SPEED GEAR.
APPLICATION FILED MAY 31, 1904. RENEWED MAR. 26, 1906.

4 SHEETS—SHEET 4.

Witnesses
Inventor
William Baines

UNITED STATES PATENT OFFICE.

WILLIAM BAINES, OF CROSBY, ENGLAND.

VARIABLE-SPEED GEAR.

No. 819,118.           Specification of Letters Patent.           Patented May 1, 1906.

Application filed May 31, 1904. Renewed March 26, 1906. Serial No. 308,034.

*To all whom it may concern:*

Be it known that I, WILLIAM BAINES, a subject of the King of England, and a resident of Crosby, in the county of Lancaster, England, have invented certain new and useful Improvements in Variable-Speed Gears, of which the following is a specification.

My invention has for its object to provide improvements in change or variable speed gears or devices and driving mechanisms especially applicable for use on motors or other self-propelled vehicles—such as motor-cycles, motor-cars of various kinds, and motor-wagons.

The invention will be described with the aid of the accompanying drawings, which illustrate the characteristics according to it as applied to motor-vehicles.

In the drawings, Figure 1 is a sectional elevation. Fig. 2 is an elevation of Fig. 1, looking toward the left. Fig. 3 is a central vertical section of Fig. 1 looking toward the left. Fig. 4 is a sectional elevation showing a modified construction of the construction shown in Fig. 1. Fig. 5 is a sectional elevation. Fig. 6 is an internal side elevation, and Fig. 7 a detail of a reversible rocking pawl or ratchet-gear on the second-motion shaft. Fig. 8 is a sectional elevation. Fig. 9 is an end view showing another modification of the variable-speed mechanism.

I will first describe the part of my invention referring to the tubular counter-shaft, which is driven from the engine or motor and by which the variable throw or stroke of the connecting-rod pin is produced—that is, this pin is moved away from and toward the axis of its shaft. This shaft in most cases will be driven from the engine through tooth or wheel gear or through chain and sprocket gear at a reduced speed, and the motion from the connecting-rod pin will be transmitted to the rod, wheel, or other driven part through a pawl and ratchet reciprocating or rocking mechanism or equivalent device on a second-motion shaft.

The same letters of reference will be used on the different drawings to indicate or mark the same or equivalent parts wherever they occur.

Referring now to the drawings, and more particularly to Figs. 1 to 3, $a$ is the tubular counter-shaft, which will be mounted and adapted to revolve in suitable bearings, and these naturally will vary according to whether the invention is applied to a motor-car, motor-cycle, or other vehicle. $b$ is the solid head fixed on the shaft $a$ and in the case shown is in the form of a disk having a slot $b'$ in it extending diametrically across it. The connecting-rod pin is designated $c$ and is fixed or carried on a block or bar $c'$, having at each end a part $c^2$, which fits and slides within the slot $b'$, the metal edges of which form a guide, and this bar has at its end further projecting parts $c^3$, which slide on the surface of the disk on each side of the slot, and the bar is kept in place and held up to its slides by plates $c^4$, fastened to the parts $c^2$ by studs $c^5$ and working in connection with or on the metal surface at the back of the disk along each side of the slot. By this construction—that is, by the block or bar $c'$ being made and adapted to work as described—a large working surface is provided, and it prevents any lateral or twisting strain within the guide. The pin $c$ is normally pressed toward the center of the disk $b$ by springs $d$, one end of which is fastened to lugs $c^6$ on the part $c^3$ and the other ends to the disk near its periphery. The pin $c$ is moved away from the zero position—namely, the position in which it is coincident with the shaft-axis—by a cord, chain, wire, or other flexible connection $e$, this flexible connection being fastened at one end to the end of the slide-block $c'$ and passing into the interior of the hollow shaft $a$, where it is attached to and works over a rotative rod or spindle (serving as a roller) $f$. When this rod is rotated in one direction, it will be seen that the cord or flexible connection $e$ is drawn toward the axis and so presses the pin $c$ from its neutral or "no-throw" position away from the center, and according to the extent of such movement the degree of throw of the connecting-rod pin and power of the mechanism will vary. The interior of the tubular shaft $a$ acts as a guide to the rod $f$, the bearing portions $f'$ of it being made larger than the others and fitting within the shaft. The opposite end $f^2$ of the rod or shaft $f$ projects beyond the tubular shaft $a$, and from this end it is operated and controlled by the driver or other person, as hereinafter described. With regard to the operating mechanism of the rotative rod $f$ the pawl $g$ is carried from the end $f^2$ of the rod by a disk $g'$, fastened on the end $f^2$, which engages with teeth on a wheel $g^2$, which is fixed to and revolves with the shaft $a$, and the rod end $f^2$ fits in the boss of this wheel $g^2$ and is free to revolve therein. The pawl $g$ will be normally pressed toward the teeth of the wheel $g^2$ and keep it engaged with them by a suitable spring. Now to vary or move or adjust the shaft or roller rod $f$—that is, to make it revolve—the pawl $g$ of a trip-gear is disengaged from the wheel $g^2$, and the disk $g'$ is held or retarded, and this is done by a hand or foot operated lever $h$, hinged at $h'$, from any suitable part of the vehicle and having an operative shoe $h^2$ at one end, which when it is moved toward the wheel $g'$ will first release the pawl $g$ from the wheel $g^2$, as the outer end of this pawl projects beyond the wheel $g'$, and so releases it from the wheel $g^2$. It will then come upon the periphery of the disk $g'$ and retard it, and this retardation causes the shaft $a$ and disk $b$ to overrun the rod or roller $f$ and so to wind up the flexible cord or connection $e$ onto this rod and move thereby the connecting-rod pin $c$ toward the periphery of the disk and increase the throw. Of course to actuate both the pawl $g$ and the disk $g'$, as described, the shoe $h^2$ will be of a width to lie over both the pawl and the disk. When the pin $c$ is coincident with the axis of the shaft $a$, it is in the position of no throw and no reciprocating motion is given to the ratchet or other gear which it revolves or actuates. By these means it will be seen that the pin $c$ can be moved to any position between the axis of the driving-disk $b$ and its extreme outward point and a corresponding throw produced, and the consequent variable speed and power will be transmitted to the actual propelling or driving wheels or parts of the vehicle. To move the pin $c$ from and out of position toward the center of the disk $b$, (which is effected by the springs $d$,) the pawl $g$ is simply released from the toothed wheel $g^2$, and this is done by the tripping-lever $h$, which will be moved only so far that the pawl $g$ will strike the shoe $h^2$ in its revolution; but the shoe will not touch the disk $g'$. Consequently as in each revolution the pawl $g$ will be removed from the teeth of the wheel $g^2$ the springs $d$ are free to act and, through the flexible connection, will turn the rod $f$ and wheel $g^2$ back again in the opposite direction to that previously effected in causing the pin $c$ to move outward. The radial lines 0 1 2 (shown in Fig. 3) indicate the three relative positions where the trip-shoe $h^2$ is quite free, trips the pawl $g$, and trips the pawl $g$ and retards the disk $g'$, respectively. The shaft $a$ can be revolved either by a sprocket or other wheel $x$, fixed on the shaft, or by providing the wheel $b$ with sprocket or other teeth and driving it through this disk by chain or other gear.

The modification shown in Fig. 4 is substantially the same as that in Figs. 1 to 3, the difference being that the flexible cord or connection $e'$ is wound on the shaft $a'$ itself, and the disk $b^x$ is not fixed on this shaft, but on an interior shaft $f^x$, and the toothed wheel $g^x$ is fixed on the end of this shaft, while the trip-pawl $y$ and its carrier-disk $g^b$ are fixed and carried on the hollow shaft $a'$. A trip-lever similar to $h$ will be used in connection with this mechanism and operated exactly in the same way as described with reference to Figs. 1 to 3 and will retard the shaft $a'$ and so wind up the connection $e'$ and release it and let the action of the springs $d^x$ take place in the same way, as in the former case. In this latter case the mechanism may be driven or revolved by driving the disk $b^x$ or by driving the shaft $f^x$, and in the latter case the sprocket or other wheel will be carried on an extension of this shaft beyond the wheel $g^x$.

In the construction shown in Figs. 8 and 9 the rod $f^6$, which operates the flexible connection $e^2$, has a sliding motion within the hollow shaft $a^2$ and is guided therein, and the flexible connection $e^2$ passes over a guide-roller $f^3$, its ends being fixed, as shown, within the portion $f^7$ of the device, which fits and slides in the shaft $a^2$. The trip-pawl $g^5$ in this case is carried on the shaft $a^2$ and is adapted to engage with circular teeth or grooves on the end portion $f^8$ of the rod $f^6$. The springs $d^3$ for bringing the pin $c^y$ to the center or position of no throw are arranged on the back of the disk $b^5$ and act precisely similarly to those in the constructions above described. The pawl $g^5$ is operated—that is, adapted—to be released from the path or grooves by a trip-ring $h^x$, operated by the driver of the vehicle or other person. In action to move the pin $c^y$ away from the axis of the shaft $a^2$ to give it throw the rod $f^6$ is drawn out by any suitable actuating-gear by pulling on the swivel-link $f^5$ on the end of this rod, and this pulls the cord or flexible connection $e^2$ into the hollow shaft $a^2$. In this action the pawl $g^5$ will be moved by the teeth in connection with which it works to and fro about its pivot, it being normally pressed toward the teeth or grooves and into engagement with them by the springs $g^4$. When the rod $f^6$ has been pulled out to give the degree of throw of the pin $c^y$ required, the pawl $g^5$ will hold the parts in this position. Then to decrease the throw the trip-ring $h^x$ will be moved in or out in relation to the axis of the shaft $a^2$, so that the pawl $g^5$ in its revolution will come in contact with a portion of the ring and so remove its engaging end from the ring-teeth of the part $f^8$, and this will allow the springs $d^3$ to pull the pin $c^y$ toward the center of the disk and the rod $f^6$ into the shaft $a^2$.

With regard to the second-motion shaft which is to be operated from the connecting-rod pin $c$, this is revolved by a connecting-rod $i$ and a rocking or reciprocating lever and pawl or ratchet mechanism on the second shaft. One of duplicate form is shown in Figs. 5 and 7. The ratchet-gears of these duplicate mechanisms consist of ratchet-wheels $l$, fixed on the shaft $k$ and working in pawl-carriers $l'$ in the form of dished disks, the pawls $l^2$ being carried within them, and one or other of the pawl-carriers and pawls $l'$ $l'$ is operated by the lever $j$ by connecting up this lever with one or the other. This is effected by a pin $m$, carried in its end and adapted to be thrown into engagement with the flange $l^2$ of one or other of the pawl-carriers $l'$ by a tongue or part $m'$, which is moved from the vehicle by any suitable operating mechanism. If the pawls in the two carriers $l'$ be arranged in the opposite directions, then, according to which set is in gear with the lever $j$, the shaft $k$ will be driven in one or other direction, and if the bolt $m$ be in the center position, as shown in Fig. 5, neither set will be operated and the engine or motor will simply vibrate the lever $j$ idly—that is, the engine will be then a "free engine."

Having now particularly described my invention, what I claim as new, and desire to secure by Letters Patent, is—

1. In a motor-vehicle rotary variable speed or power gear, a part for transmitting the motion, movable away from, and toward the axis; a carrier for said part; a flexible band connected with said part, and passed to the center of the gear, and adapted to be operated therefrom; a hollow shaft carrying said carrier; and manually-controlled means connected with said hollow shaft for moving said flexible connection; substantially as set forth.

2. In a motor-vehicle rotary variable speed or power gear, the part $c$ for transmitting the motion, movable away from and toward the axis: the carrier $b$ for the part $c$; the hollow shaft $a$ carrying said carrier $b$; the flexible band $e$ connected with the part $c$; the rod $f$ within the hollow shaft $a$; and engaging and disengaging parts on said hollow shaft $a$ and said internal rod $f$, for moving same in relation to each other and manually-controlled means for effecting such connection and disconnection; substantially as herein set forth.

3. In a motor-vehicle rotary variable speed or power gear, the pin $c$ for transmitting motion, movable away from and toward the axis; a hollow shaft $a$; a carrier $b$ for carrying the pin $c$ and adapted to permit of the pin $c$ being slid radially therein; a flexible connection $e$ connected with said pin and with the hollow shaft adapted to move in one direction; an internal rod $f$; springs $d$ connected with the pin $c$ and carriers $b$ for moving the pin in the opposite direction; and manually-controlled trip mechanism connected with the shaft $a$ and rod $f$ adapted to move same in relation to each other; substantially as set forth.

4. In a variable-speed device, a tubular counter-shaft, a disk carried thereby, a crank-pin slidably carried by said disk, spring means for normally holding the pin in the center of the disk, a spindle rotatable within the counter-shaft, a flexible band having its ends connected respectively with the spindle and counter-shaft, a disk carried by the spindle outside the counter-shaft, a pawl on said disk, a ratchet-wheel connected with the counter-shaft, and manually-controlled means for operating the pawl and braking the disk, substantially as described.

In witness whereof I have hereunto set my hand in presence of two witnesses.

WILLIAM BAINES.

Witnesses:
S. GOODALL,
FRANK E. FLEETWOOD.